July 21, 1931.  A. E. WIGELSWORTH  1,815,385
HUMIDIFYING SYSTEM
Filed Feb. 21, 1930
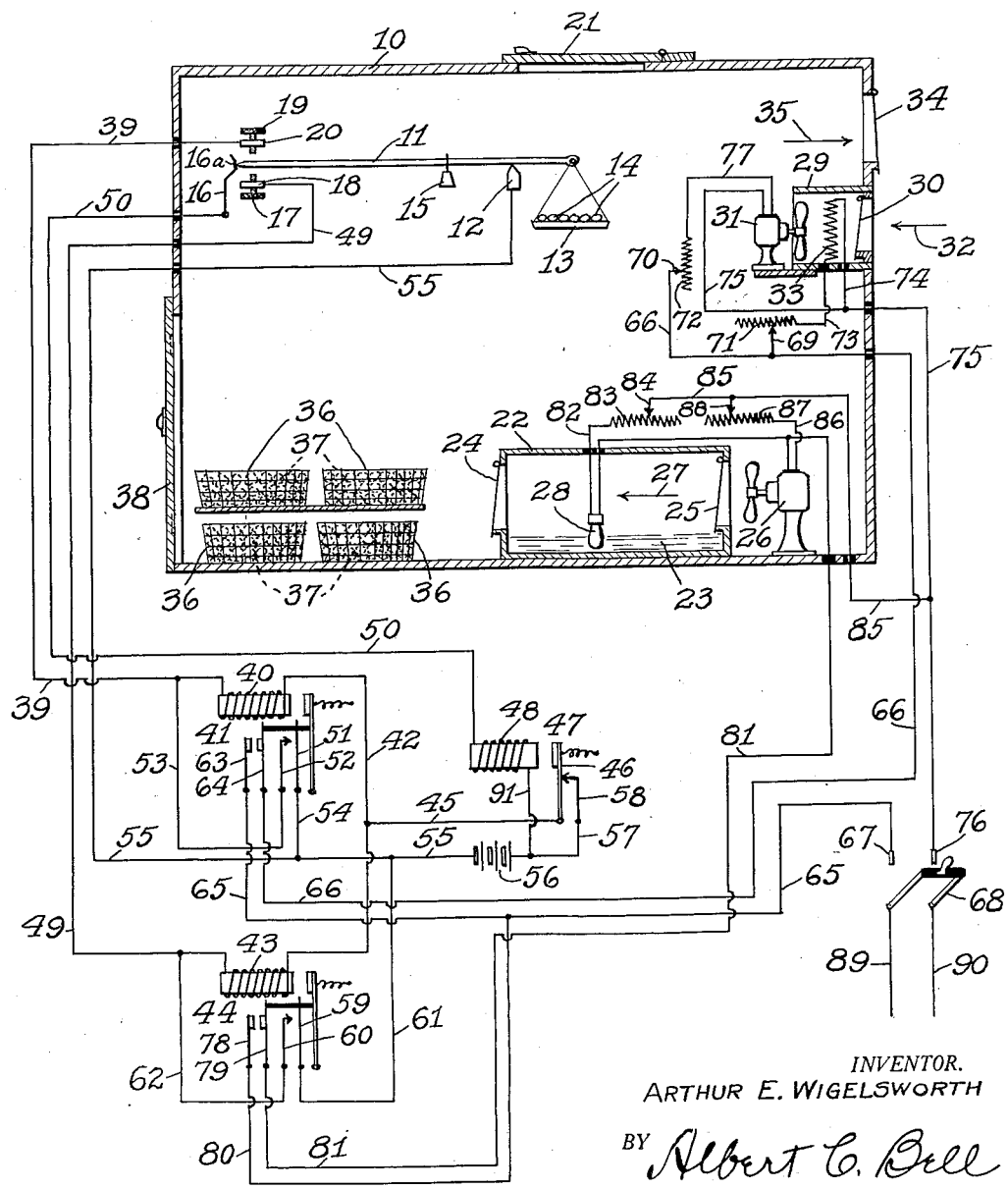
INVENTOR.
ARTHUR E. WIGELSWORTH
BY Albert C. Bell
ATTORNEY.

Patented July 21, 1931

1,815,385

UNITED STATES PATENT OFFICE

ARTHUR E. WIGELSWORTH, OF CHICAGO, ILLINOIS, ASSIGNOR TO PATHOMETRIC LABORATORIES, INC., OF CHICAGO, ILLINOIS, A CORPORATION OF ILLINOIS

HUMIDIFYING SYSTEM

Application filed February 21, 1930. Serial No. 430,214.

My invention relates to an improved humidifying system by which the air in a receptacle may be given a desired degree of humidity, determined by the amount of liquid content it is desired that any particular articles shall contain. By my invention, I provide devices for increasing the amount of liquid in vapor form in the air in the receptacle, which are controlled as to their operation by the quantity of liquid that may be contained from time to time in articles which are to be maintained at a desired degree of liquid content by the operation of the apparatus. In other words, there is no necessity with my humidifying system of controlling the apparatus of the system by the complicated and delicate devices which have been heretofore proposed for maintaining exact degrees of humidity, since the liquid content of the articles themselves determines whether more liquid in vapor form, shall be delivered to the air in the receptacle or not.

In carrying out my invention, where it is desired to maintain a certain kind of article at substantially a predetermined liquid content, I make use of a convenient number or quantity of the articles as the controlling means for determining the quantity of liquid in vapor form in the air in the receptacle containing the articles. This I accomplish by supporting the controlling articles on a member or mechanism of the kind commonly used for weighing purposes, so that the member will have one position when the control articles contain one amount of the liquid, and other positions when the control articles contain other quantities of the liquid. The position of the member or weighing apparatus when the control articles contain the desired quantity of liquid may be considered the neutral condition or position of the member or weighing apparatus, for which the liquid content of the air in the receptacle is to remain unchanged. If however, the control articles lose part of their liquid content and so become lighter in weight, the supporting member or weighing mechanism assumes another position, which controls an operating circuit extending to apparatus provided in the receptacle for increasing the amount of liquid in vapor form contained in the air in the receptacle, as a result of which the control articles absorb a part of the increased vapor in the air, and become heavier in weight, moving the member or weighing mechanism again to its neutral position, for which position, the said member or weighing mechanism may control an operating circuit of devices for interrupting the operation of the humidifying devices. In this manner, articles similar to the control articles, which may be placed in the receptacle to be maintained at substantially the desired degree of liquid content, are maintained in substantially the same condition as to liquid content, as the control articles. It will be observed at once that with this system, there is no need for accurately determining the liquid content of the air at any time, since all that is required is to have the control articles in the desired condition as to liquid content, place them on the supporting member or weighing mechanism and establish the neutral condition of the member or weighing mechanism by any convenient means, for example adjusting screws or balancing weights, and the apparatus of the system is at once adjusted and set to maintain any quantity of the articles that may be placed in the receptacle, whether at the same time or successively, in substantially the same condition of liquid content as the control articles, and that since the articles are all contained in the receptacle, they will all be subject to the same action, and the liquid content of the control articles and of the larger bulk of articles being treated in the receptacle, will vary simultaneously for variations in the liquid content of the air in the receptacle.

By my invention I also provide additional devices for depriving the air in the receptacle of a part of its liquid content in vapor form, or drying the air, if for any reason the liquid content of the control articles becomes too great. Under the conditions last named, the control articles become heavier than their desired condition corresponding to the neutral position of the supporting member or weighing mechanism, and the supporting member or weighing mechanism assumes a third position which may control the operating circuit of the devices employed to deprive the air of a part of its liquid content, which latter operating circuit may also be under the control of the mechanism actuated by the neutral condition of the member or weighing mechanism, so that when the member or weighing mechanism again assumes its neutral position, the action of the devices depriving the air of its liquid content may be interrupted.

My invention will best be understood by reference to the accompanying drawing showing a preferred embodiment thereof which is illustrative of apparatus and circuit arrangements that may be employed in carrying out my invention. As shown in the drawing, I provide a receptacle 10 which is completely enclosed, in which a scale beam 11 is supported on a fulcrum 12. The shorter end of the scale beam 11 supports a tray 13 carrying desired ones 14 of the articles to be given a desired degree of liquid content, which for convenience may be called the control articles. The number of articles carried by the tray 13 is unimportant, the only requirement being that when the apparatus is adjusted, the control articles 14 shall contain the desired degree of liquid content. For this condition, the scale beam 11 is balanced by means of a weight 15, in which position the end of the longer arm of the scale beam engages a contact spring 16 which is preferably of such a yielding nature that its engagement with the end of the scale beam 11, produces a negligible amount of friction. The contact spring 16 is preferably provided with a slight indentation 16a, to receive the end of the scale beam 11, for the position of the scale beam assumed when the liquid content of the control articles 14 is of the desired amount, which position may be called the neutral position of the scale beam. When the control articles 14 lose a part of their liquid content, due to the air in the receptacle becoming less humid than required to impart a desired condition of liquid content to the articles, the load on the tray 13 becomes less than before, the scale beam 11 is thrown out of balance, and the longer end of the scale beam moves from engagement with the contact spring 16 and into engagement with the electric contact 17, which may conveniently consist of a screw threaded through a fixed abutment 18 carried by the receptacle 10. Similarly, should the air in the receptacle 10 contain more liquid in vapor form than required to impart the desired liquid content to the control articles 14, the tray 13 and its contents become heavier than for the neutral condition above referred to, and the longer end of the scale beam 11 is raised from engagement with the contact spring 16, and into engagement with a second contact 19 similar to the contact 17 and supported by an abutment 20 similar to the abutment 18. The contact screws 17 and 19 afford a convenient means for limiting the permissible variation in liquid content of the articles 14 above and below their neutral condition. A door 21 is provided in the receptacle 10 to facilitate placing the control articles 14 on the tray 13 and adjusting the scale beam as described.

The receptacle 10 contains in its lower portion, an enclosed passageway 22, the lower portion of which is supplied with liquid 23, the vapor of which is to be maintained at such an amount in vapor form in the air in the receptacle, as required to maintain the liquid content of the control articles 14 at the desired point. The passageway 22 is provided at its ends with hinged doors 24 and 25 of light material, for example aluminum, so that the doors will readily be opened when the fan 26 in the receptacle 10, is operated to produce a current of air through the passageway 22 in the direction indicated by the arrow 27. By circuit connections below described, the engagement of the scale beam 11 with the electric contact 17, causes operation of the fan 26, which in turn produces an air current through the passageway 22 and this in turn carries a part of the liquid 23 in vapor form into the receptacle to increase the liquid content of the air in the receptacle. This in turn increases the liquid content of the control articles 14 and of any similar articles that may be contained in the receptacle. In some cases, it may be desirable to more rapidly increase the liquid content of the air in the receptacle 10 than could be accomplished by the air current alone, and to effect this more rapid action I provide an electric heater, for example an incandescent lamp 28, in the liquid 23, which may be placed in operation to a desired degree as will be explained, when the fan 26 is operated. When the liquid content of the air in the receptacle 10 reaches the desired amount, the operation of the fan 26, and the operation of the heating device 28 if in use, are discontinued by engagement of the scale beam 11 with the spring contact 16 in a manner to be described, the doors 24 and 25 assume their closed position, and transfer of the liquid 23 in the passageway 22 to the air in the receptacle 10, stops. It will be observed that the air current produced in transferring the liquid from the passageway 22 to the air in the receptacle 10 is a circulatory one extending through all parts of the receptacle 10 so that articles contained in any part of the receptacle which are similar to the control articles 14, will be similarly influenced as to liquid content.

One side wall of the receptacle 10 is shown as provided with a tube 29 extending into the receptacle, and closed at its outer end by a hinged door 30 of light material, for example of aluminum, so that when a second fan 31 mounted adjacent the inner end of the tube is operated, the door 30 will be opened and a current of external air will be moved through the tube, in the direction indicated by the arrow 32. A heating coil 33 is preferably disposed in the tube 29 in the path of said air current, so that by operation of the fan 31, heated air is delivered into the receptacle 10. Since the receptacle is entirely enclosed, I provide the wall of the receptacle with a second hinged door 34 of light material, for example aluminum, opening outwardly so that air may flow as indicated by the arrow 35, through the door 34 and from the receptacle, to compensate for air drawn into the receptacle through the door 30. When the air in the receptacle 10 contains a higher degree of liquid content than desired for the control articles 14, the engagement of the scale beam 11 with the contact screw 19 operates the motor 31 and the coil 33 in a manner to be described below, to deliver heated air to the receptacle and to discharge a part of the air in the receptacle through the door 34, thereby reducing the quantity of liquid content in the air in the receptacle 10.

In connection with the operation of the devices controlled either by engagement of the scale beam 11 with the contact screw 17 or the contact screw 19, I find it desirable to provide a time interval during which the desired changed condition of liquid content of the air in the receptacle 10 may be effected so that the said operation will continue after the scale beam has moved from engagement with the particular one of the contact screws initiating the operation. By arranging the operating apparatus as described, I am able to adjust the contact screws 17 and 19 so that but small clearance exists between them and the scale beam 11 and the degree of liquid contained in the articles 14 and other similar articles in the receptacle 10 may be maintained with a correspondingly high degree of accuracy.

It will be understood that a quantity of articles similar to the control articles, may be contained in the receptacle 10 in any convenient manner, for example in wire crates or baskets 36 as indicated at 37. One wall of the receptacle 10 is preferably provided with a door 38 to facilitate placing the articles 37 in the receptacle 10 and removing the same therefrom.

The electrical circuits employed in connection with my humidifying system are as follows: the contact screw 19 through its abutment 20 is connected by wire 39 with one terminal of the winding 40 of a relay 41, the other terminal of which is connected by wire 42 with a corresponding terminal of the winding 43 of a second relay 44 similar to the relay 41. The wire 42 is connected by wire 45 with the armature 46 of a relay 47. The contact screw 17 is connected through its abutment 18 by wire 49 with the other terminal of the winding 43. The contact spring 16 is connected by wire 50 with one terminal of the winding 48 of the relay 47. The relay 41 is provided with a first pair of normally open contacts 51 and 52; the contact 52 being connected by wire 53 with the wire 39, and the contact 51 being connected by wire 54 with wire 55 extending from the fulcrum 12 to one terminal of a battery 56, or other source of electric energy, preferably of low voltage. The other terminal of the battery 56 is connected by wire 57 with a contact 58 of the relay 47 which is normally in electrical contact with the armature 46 of said relay. The other terminal of the winding 48 is connected by wire 91 with wire 57. The relay 44 is provided with a first pair of contacts 59 and 60 connected respectively by wires 61 and 62 with wires 55 and 49.

The circuit connections thus far described are the ones involved in controlling the operation of the relays 41, 44 and 47 from the electric source 56.

The relay 41 is also provided with a second pair of contacts 63 and 64 connected by wires 65 and 66 respectively with one contact 67 of a main switch 68 and with the adjustable contacts 69 and 70 engaging resistances 71 and 72. One terminal of the resistance 71 is connected by wire 73 with one terminal of the heating coil 33, the other terminal of which is connected by wire 74 with wire 75 which is connected with the other contact 76 of the main switch 68. One terminal of the resistance 72 is connected by wire 77 with one terminal of the motor 31, the other terminal of which is connected with wire 75.

The relay 44 is provided with a second pair of contacts 78 and 79 connected respectively by wires 80 and 81 with wire 65 and with one terminal each of the motor 26 and of the heating device 28. The other terminal of the heating device 28 is connected by wire 82 with one terminal of the resistance 83, the adjustable contact 84 of which is connected by wire 85 with wire 75. The other terminal of the motor 26 is connected by wire 86 with one terminal of the resistance 87, the adjustable contact 88 of which is connected with wire 85. The main switch 68 is connected with main feed wires 89 and 90 for supplying electric current from any convenient source not shown, to the motors and heating elements, which current may have any desired voltage adapted to operate said devices.

As a result of the circuit connections described, when the beam 11 engages the contact screw 17, corresponding to a condition of too little liquid content in the control articles 14, the following circuit is closed: battery 56, wire 57, contact 58, armature 46, wire 45, wire 42, winding 43, wire 49, contact screw 17, beam 11, fulcrum 12, wire 55 back to battery 56. The circuit closed through winding 43, energizes the relay 44, closing its pairs of contacts 59 and 60, and 78 and 79. The closure of the contacts 59 and 60 insures maintaining the energized condition of the relay 44 as long as the relay 47 is not energized, through the following path, whether the beam 11 remains in engagement with the contact screw 17 or not: battery 56, wire 57, contact 58, armature 46, wire 45, wire 42, winding 43, wire 62, contact 60, contact 59, wire 61, wire 55 back to battery 56. The main switch 68 being closed to permit operation of the humidifying and drying devices in the receptacle 10, the engagement of the contacts 78 and 79 closes the following circuit: main conductor 89, switch 68, contact 67, wire 65, wire 80, contact 78, contact 79, wire 81, to one terminal of the motor 26 and also to one terminal of the heating device 28. From the other terminal of the motor 26, the circuit continues through wire 86, resistance 87, adjustable contact 88, wire 85, wire 75, contact 76, switch 68, to the other main supply conductor 90, thus operating the motor 26 at a speed controlled by the setting of the adjustable contact 88 on the resistance 87. From the other terminal of the heating device 28, a circuit is continued through wire 82, resistance 83, adjustable contact 84 to wire 85 and to the other main conductor 90 through the path already traced. This serves to operate the heating device 28 to the degree determined by the position of the adjustable contact 84 on the resistance 83. It will be observed that the adjustable contacts 84 and 88 may be moved to any desired position on the resistances 83 and 87, and that either of the adjustable contacts may be moved entirely from engagement with the corresponding resistance, so that either or both of the operating circuits just traced may be made effective by the closing of the contacts 78 and 79, depending upon whether it is desired to use the fan 26 alone, or to use the heating device 28 alone, or to use both the fan 26 and the heating device 28 at the same time. Where it is desired to use the heating device 28 alone, one or both of the doors 24 and 25 may be held in open position.

As a result of the circuits described, the humidifying devices remain in operation until the relay 47 is energized. Hence the air in the receptacle 10 has an increasing amount of liquid delivered to it in vapor form, the control articles 14 become heavier, the beam 11 moves from engagement with the contact screw 17, and this continues until the beam reaches its neutral position, corresponding to a desired amount of liquid content in the articles 14, for which condition, the beam 11 engages the contact spring 16 and closes the following circuit: battery 56, wire 57, wire 91, winding 48, wire 50, contact spring 16, beam 11, fulcrum 12, wire 55 back to battery 56. This energizes the relay 47 and moves its armature 46 from engagement with its contact 58, thus opening the energizing circuit of the winding 43 and opening the pairs of contacts 59 and 60 and 78 and 79, thus opening the locking circuit of the relay 44 and also opening the circuits through the humidifying devices. The operation of the humidifying devices described, is repeated as often as the beam 11 makes electrical contact with the contact screw 17, and the time interval between the energization of the relay 44 by engagement of the beam 11 with the contact screw 17 to actuate the humidifying devices, and the energization of the relay 47 by engagement of the beam 11 with the contact spring 16 to discontinue the operation of the humidifying devices, is determined by the closeness of adjustment of the contact screw 17 to the beam 11 with the latter in its neutral position.

When the beam 11 engages the contact screw 19, for a condition of too great liquid content in the control articles 14, the following circuit is closed: battery 56, wire 57, contact 58, armature 46, wire 45, wire 42, winding 40 of relay 41, wire 39, contact screw 19, beam 11, fulcrum 12, wire 55 back to battery 56. This energizes the relay 41 and moves its pairs of contacts 51 and 52 and 63 and 64 respectively into engagement with each other. The closing of the contacts 51 and 52 closes a second path for the flow of energizing current through the winding 40, independent of the contact screw 19, as follows: battery 56, wire 57, contact 58, armature 46, wire 45, wire 42, winding 40, wire 39, wire 53, contact 52, contact 51, wire 54, wire 55, back to battery 56. As a result, the relay 41 remains energized until the energization of the relay 47. The closing of the contacts 63 and 64 closes the following circuits, assuming that the main switch 68 is closed to permit operation of the humidifying and drying devices: main conductor 89, switch 68, contact 67, wire 65, contact 63, contact 64, wire 66, to adjustable contacts 69 and 70 engaging the resistances 71 and 72 respectively. The circuit is continued from resistance 71 by wire 73 to heating coil 33, wire 74, wire 75, contact 76, switch 68 back to main supply conductor 90. A second circuit is also completed from resistance 72 through wire 77, fan 31, wire 75, and through the path just traced to main supply conductor 90. This results in heating the coil 33 and operating the fan 31, the amount of heating, and the speed of the fan depending upon the adjustment of the contacts 69 and 70 on the resistances 71 and 72 respectively. It will be understood that the contacts 69 and 70 may be adjusted so that either the heating coil 33 operates alone, the fan 31 operates alone, or both operate at the same time, depending upon the particular circumstances of any case. The operation of the drying devices 31 and 33 continues until energization of the relay 47, during which interval the control articles 14 become lighter and the beam 11 moves from engagement with the contact screw 19 to its neutral position, and when the latter position is reached, the beam 11 engages the contact spring 16 energizing the relay 47 through the circuit above traced. This separates the contact 58 and armature 46 in the manner above described, opening the energizing circuit of the relay 41 above traced, which permits the pairs of contacts 51 and 52 and 63 and 64 to move respectively from engagement with each other, thereby placing the relay 41 in position for subsequent operation, and opening the operating circuit of the drying devices 31 and 33. The time interval between the operation of the drying devices by engagement of the beam 11 with the contact screw 19, and the stopping of said operation by engagement of the beam 11 with the contact spring 16, is determined by the closeness of the setting of the contact screw 19 to the beam 11 in its neutral position.

It will be understood that my system described may be employed with water or any other desired liquid, the vapor of which is to be absorbed to a desired degree by the control articles and by similar articles placed in the receptacle for treatment, and that the receptacle may be of any size required to accommodate the articles being treated. It will also be understood that the scale beam shown is illustrative of any member or mechanism having different positions determined by whether the liquid content of the control articles is too high, too low, or of the desired amount and that in referring to the fan 26 and the heating device 28 as humidifying devices, these devices are illustrative of any devices that may be employed to increase the liquid content in vapor form, of the air in the receptacle 10, whatever the liquid may be that is employed to treat the articles contained in the receptacle, and that similarly the fan 31 and the heating coil 33 referred to as drying devices are illustrative of any devices that may be employed to decrease the amount of liquid in vapor form, in the air in the receptacle, whatever liquid may be used to treat the articles in the receptacle.

Many articles may be treated by my system described, for example tobacco in different forms with regard to water and other volatile content, celluloid articles with regard to solvent content for example acetone, gelatine articles with regard to water and other volatile content, and various solid chemicals with regard to water and other volatile content. In fact my system may be used to treat any articles or substances capable of absorbing liquid vapor of one kind or another from the atmosphere surrounding them, whether it be desired to maintain said articles in a dry condition, a moist condition, or any intermediate condition as to liquid content. It will further be observed that while such treatment of many articles or substances may be effected to advantage with air as the gaseous medium surrounding them, any desired gas may be so used by filling the receptacle with and surrounding it by said gas, for example in treating chemicals readily oxidized in the presence of air, an atmosphere of nitrogen may be used.

While I have shown my invention in the particular embodiment above described, it will be understood that I do not limit myself to this exact construction as I may employ equivalents known to the art at the time of the filing of this application without departing from the scope of the appended claims.

What I claim is:

1. In a humdifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquor vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter.

2. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said first devices comprising a passageway in said receptacle and containing liquid to be vaporized, and a fan for moving a gas current through said passageway, said passageway having doors opened by said gas current to permit the latter to enter and leave said passageway.

3. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said second devices comprising a heating unit and a fan for moving a gas current into said receptacle across said heating unit and from said receptacle, said receptacle having doors opened by said gas current last named.

4. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said first devices comprising a passageway in said receptacle and containing liquid to be vaporized, a fan for moving a gas current through said passageway, said passageway having doors opened by said gas current to permit the latter to enter and leave said passageway, means for heating the liquid in said passageway, and devices for increasing and decreasing the heating effect of said heating means as desired.

5. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the later, said third devices comprising electromagnetic mechanism and electric contacts in closed relation for the deenergized condition of said mechanism, the operating circuits of said first and second devices extending through said last named contacts.

6. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said third devices comprising electromagnetic mechanism and electric contacts in closed relation for the deenergized condition of said mechanism, the operating circuits of said first and second devices extending through said last named contacts, each of said first and second devices including locking contacts maintaining said devices in operation until actuation of said third devices.

7. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said first devices comprising a passageway in said receptacle and containing liquid to be vaporized, and a fan for moving a gas current through said passageway, said passageway having doors opened by said gas current to permit the latter to enter and leave said passageway, and said third devices comprising electromagnetic mechanism and electric contacts in closed relation for the deenergized condition of said mechanism, the operating circuits of said first and second devices extending through said last named contacts, said first devices including in their operating circuit locking contacts closed by operation of said first devices and placing control of the stopping of said operation in the contacts of said third devices.

8. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said second devices comprising a heating unit and a fan for moving a gas current into said receptacle across said heating unit and from said receptacle, said receptacle having doors opened by said gas current, and said third devices comprising electromagnetic mechanism and electric contacts in closed relation for the deenergized condition of said mechanism, the operating circuits of said first and second devices extending through said last named contacts, said second devices including in their operating circuit locking contacts closed by operation of said second devices and placing control of the stopping of said operation in the contacts of said third devices.

9. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said first devices comprising a passageway in said receptacle and containing liquid to be vaporized, and a fan for moving a gas current through said passageway, said passageway having doors opened by said gas current to permit the latter to enter and leave said passageway, and said second devices comprising a heating unit and a fan for moving a gas current into said receptacle across said heating unit and from said receptacle, said receptacle having doors opened by said gas current last named.

10. In a humidifying system, the combination of a receptacle for containing articles to be maintained at a desired liquid content, a scale beam in said receptacle, a carrier for supporting a desired number of said articles from said beam, means for balancing said beam with said desired liquid content in said articles so supported, electric contacts for actuation by said beam for its balanced condition and for weights of said supported articles greater and less than their balancing weight respectively, first electrically actuated devices for increasing the amount of liquid vapor in said receptacle, second electrically actuated devices for decreasing the amount of liquid vapor in said receptacle, third electrically actuated devices controlling the operation of said first and second devices, and electric circuits controlled by said contacts and extending therefrom to said devices and selectively controlling the operation of the latter, said first devices comprising a passageway in said receptacle and containing liquid to be vaporized, and a fan for moving a gas current through said passageway, said passageway having doors opened by said gas current to permit the latter to enter and leave said passageway, said second devices comprising a heating unit and a fan for moving a gas current into said receptacle across said heating unit and from said receptacle, said receptacle having doors opened by said gas current, and said third devices comprising electromagnetic mechanism and electric contacts in closed relation for the deenergized condition of said mechanism, the operating circuits of said first and second devices extending through said last named contacts, said first and second devices including in their operating circuits respectively locking contacts closed respectively by their operation and placing control of the stopping of said operation in the contacts of said third devices.

11. In a humidifying system, the combination of a receptacle for articles to be given a desired liquid content, a member in said receptacle for supporting desired ones of said articles and having different positions determined by the liquid content of said supported articles, first electrically actuated devices for increasing the humidity in said receptacle, an operating circuit for said devices controlled by a first position of said member, second electrically actuated devices for decreasing the humidity in said receptacle, an operating circuit for said second devices controlled by a second position of said member, other electrically actuated devices for also controlling said operating circuits, and an operating circuit for said other devices controlled by a third position of said member.

12. In a humidifying system, the combination of a receptacle for articles to be given a desired liquid content, a member in said receptacle for supporting desired ones of said articles and having different positions determined by the liquid content of said supported articles, electrically actuated devices for increasing and decreasing the humidity in said receptacle for different positions of said member, and other electrically actuated devices controlling the operation of said first named devices for a still different position of said member.

In witness whereof, I hereunto subscribe my name this 15th day of February, A. D. 1930.

ARTHUR E. WIGELSWORTH.